UNITED STATES PATENT OFFICE.

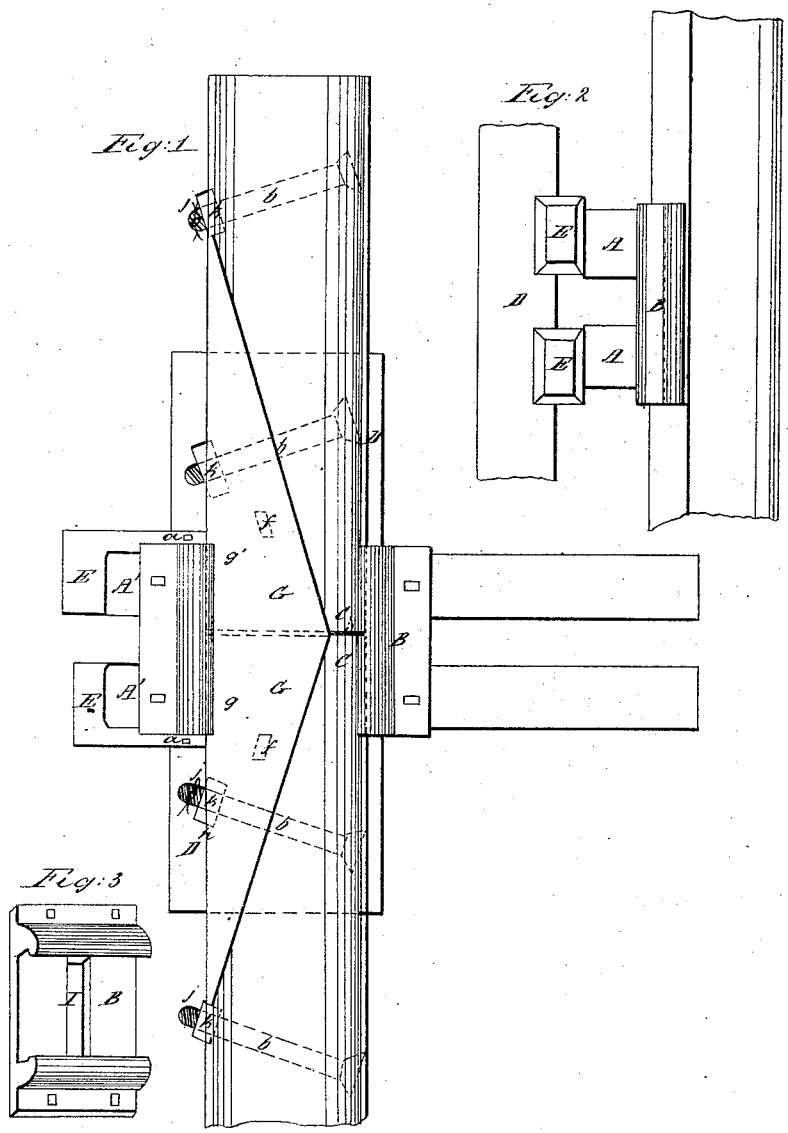

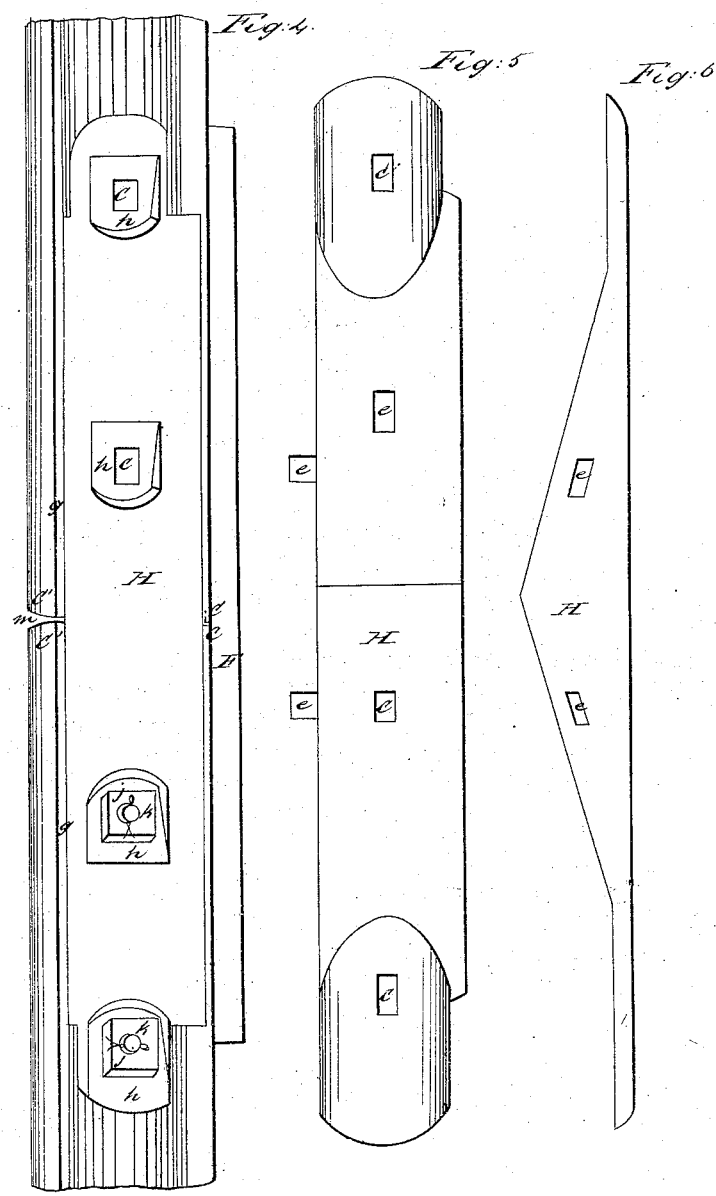

GEORGE PALMER, OF LITTLESTOWN, PENNSYLVANIA.

IMPROVEMENT IN JOINTS OF RAILROAD-RAILS.

Specification forming part of Letters Patent No. 69,241, dated September 24, 1867.

*To all whom it may concern:*

Be it known that I, GEORGE PALMER, of Littlestown, in the county of Adams, in the State of Pennsylvania, have invented certain new and useful improvements in the mode of leveling up and securing the joints of the rails in railroads, and to prevent the striking and clapping when the cars run over them; and the following is a full, clear, and exact description of the same, reference being had to the accompanying drawings making a part of this specification, in which there are two plates.

Figure 1 represents a plan or top view of cross-ties, foundation-block, wedges, chair, ends of two rails, and angular connecting-piece. Fig. 2 shows an outside end view of the same. Fig. 3 is a perspective view of the foundation-block and wedges. Fig. 4 shows a perspective of the chair, Plate No. 2. Fig. 5 shows an outside view of the ends of two rails and the angular connecting-piece; Fig. 6, a side view of the angular connecting-piece, detached from the rails. Fig. 7 is an under-side view of the same. Fig. 8 shows the inside strap, in which the bolt-heads are fitted.

The object of my invention is to prevent the striking, clapping, and bruising the ends of the rails when they come together.

My invention consists in beveling off the upright portion of the ends of the rails, and fitting in pieces of steel or hard iron, so as to make the joints come together on oblique angles, and putting the bolts through at a right angle with the joints, so that they will not open by the contraction of the rails, nor allow any notch or weak place for the car-wheels to crush or bruise, so as to make a hammering or a clattering noise by the running of the train; also, in providing an outlet under the joint, by having an opening through the chair-seat, so that no gravel or other hard substance will lodge between the lower portion of the ends of the rails.

To enable others to make and use my improvements, I will describe them more fully, referring to the drawings and to the letters marked thereon.

To make the joints where the ends of the rails come together more firm and substantial, and to prevent them from crushing, so that the wheels of the cars hammer against them, causing much jarring, clattering, and noise when the trains are running, I have an angular recess, G, made on the outside of the upright portion of the ends of each rail, as seen in Fig. 1, the angle being very oblique, extending back on the rails from five to ten inches, more or less. In the recess G I have fitted a connecting-bar, H, as seen in Figs. 6 and 7, which rests firmly on the flat portion $g\ g$ of the recesses G in the ends of the rails C C, and is held in its place to the rails by the bolts $b\ b\ b$, put through oblong holes $c\ c\ c$, so inclined as to be at right angles with oblique angles of rails C and connecting-bar H, so that the contraction or expansion of the rails will not either open or close the joints to admit gravel or other substance into them. In the flat part of the recesses $g\ g$ are oblong holes $f\ f$, into which dowel-pins $e\ e$, on the under side of the connecting-bar H, fit, the ends of the rails C C being beveled off on the under side, so as to leave an open space, $p$, where they come to rest on the chair B, which has an opening, I, through it, to let through anything that can work into the small space $i$ on the inside of the track, between the connecting-bar H and the inside supporting-strip J, the connecting-bar H being made of steel or hard, tough iron, and covering nearly the whole width of the top of the rail, thus effectually breaking the joint, so that it cannot be felt by the car-wheels as they pass over the joints. The several bolts $b\ b$ may have holes through them, and a key or pin, $j$, may be inserted to prevent the nut $k$ from working off, so as to loosen the angular joint and allow it to part open to any extent.

Thus it will be seen that my invention and improvements, as above described, will effectually remedy the difficulty of keeping the rails up at their joints, and the whole structure of a railroad in a good and safe condition, and enable it to be kept so, with one-fourth the expense now required to tend a road; and, furthermore, it will be seen that by my mode of constructing the chairs, and securing the joints by the steel connecting-bars, fitted in and secured as herein described, there can be no possibility of the rails clattering or of their ends being crushed by the hammering of the car-wheels, so that the cars must run as smoothly and evenly as if there were no joints and the track were a continuous rail.

Having thus fully described my invention, what I claim as new, and desire to secure by Letters Patent, is—

1. The connecting-bar H, constructed as described, with the bottom of the recesses m m parallel to the inclined faces of the connecting-bar, in combination with the rails and diagonal bolts b b, when the bolts are at right angles to such inclined faces, as herein described, for the purposes set forth.

2. In combination with the above, the chair B, provided with a slotted base, as and for the purposes specified.

GEORGE PALMER.

Witnesses:
J. B. WOODRUFF,
E. M. DENNISON.